May 27, 1958
L. H. ALLEN, JR., ET AL
2,836,589
VISCOSE HEATING
Filed May 17, 1954
2 Sheets-Sheet 1
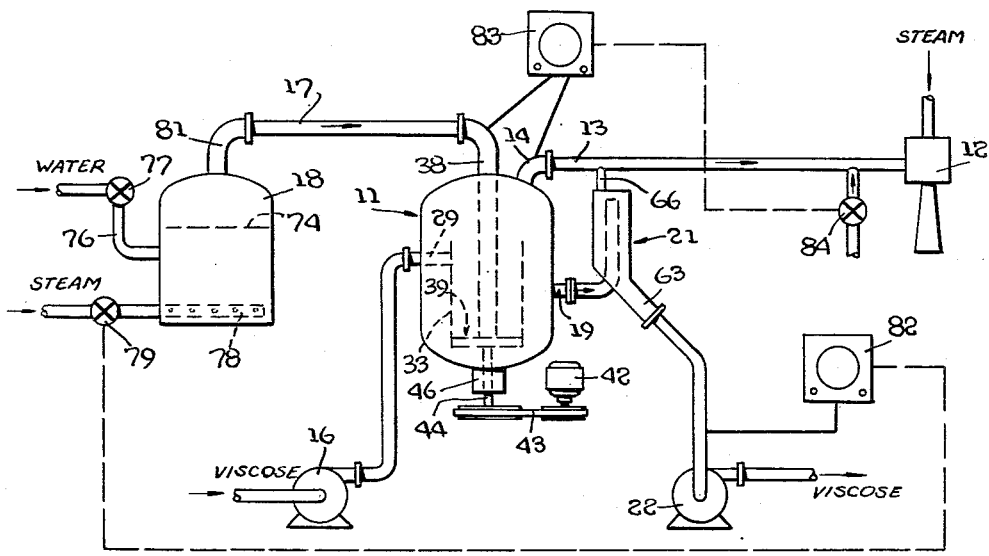
Fig. 1.
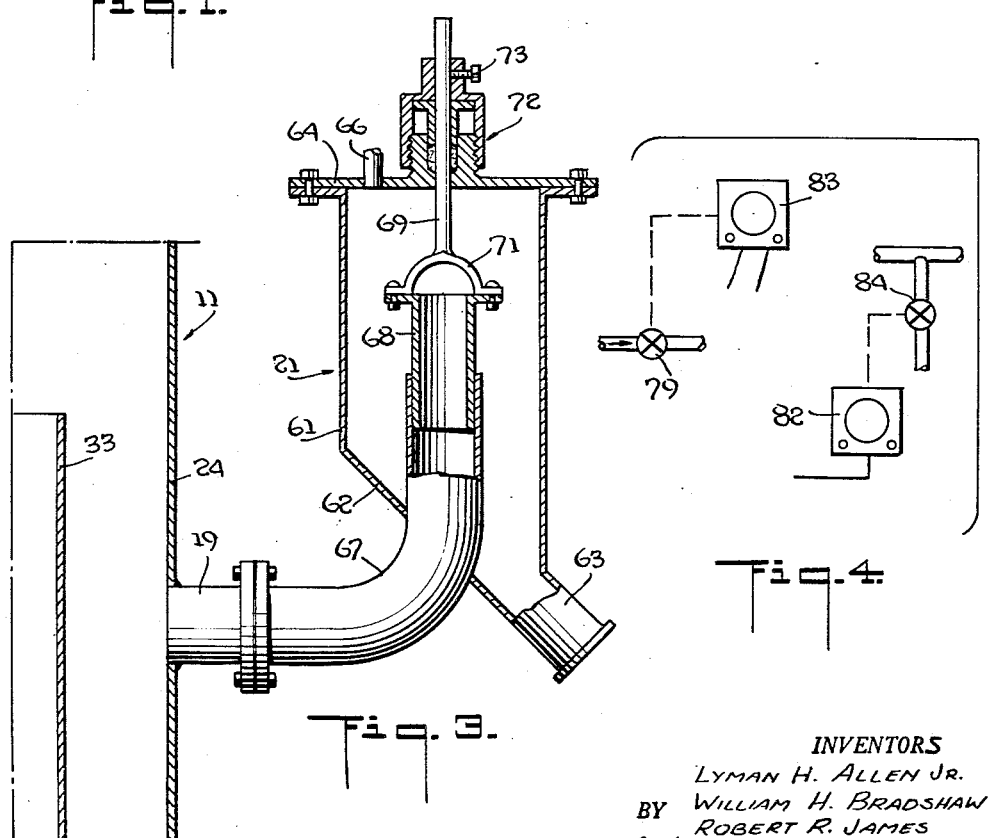
Fig. 3.
Fig. 4.
INVENTORS
LYMAN H. ALLEN JR.
BY WILLIAM H. BRADSHAW
ROBERT R. JAMES
ATTORNEYS

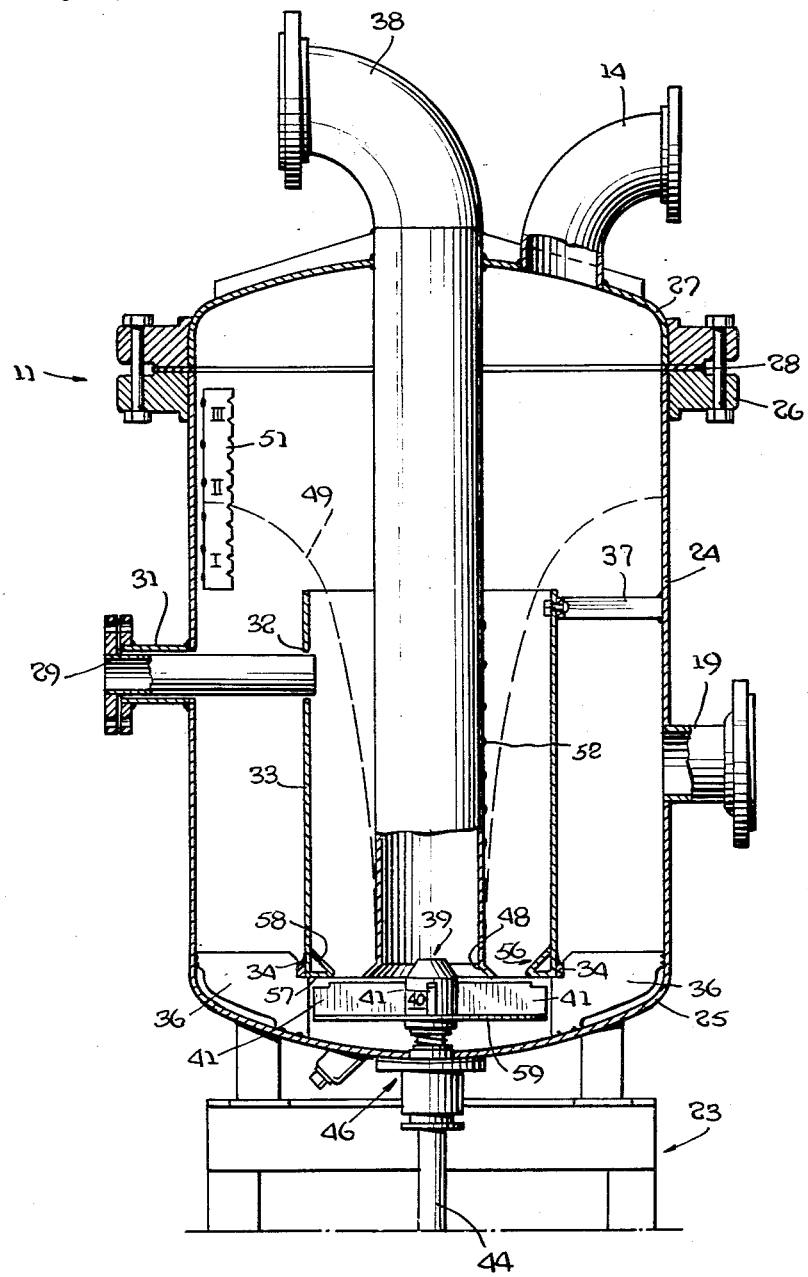

2,836,589
VISCOSE HEATING

Lyman H. Allen, Jr., and Robert R. James, Charlotte, N. C., and William H. Bradshaw, New Rochelle, N. Y., assignors to Celanese Corporation of America, New York, N. Y., a corporation of Delaware Application May 17, 1954, Serial No. 430,368

22 Claims. (Cl. 260—218)

This invention relates to heating and relates more particularly to the heating of a viscose solution.

In the preparation of articles of regenerated cellulose by the viscose method, it is customary to employ a viscose solution produced by dissolving cellulose xanthate in aqueous alkali. The viscose solution, which is a liquid of relatively high viscosity, is extruded in the form of a film, filament or other desired shape into an aqueous acidic bath where the viscose solution is coagulated. Before this extrusion operation, the viscose solution is generally subjected to a ripening treatment during which certain chemical changes take place which make it easier to coagulate the solution. Customarily, this ripening treatment is carried out by allowing the viscose solution to stand for one to three days at a controlled temperature of 15 to 20° C.

It is known that an increase in the temperature of the viscose solution, e. g. to a temperature of up to about 40° C., will appreciably increase the rate of ripening thereof, even to such an extent as to permit the ripening operation to be carried on continuously in apparatus of smaller size. However, there are numerous practical problems in heating the viscose solution in a uniform manner to the desired elevated ripening temperatures. For example, the use of heating tubes or other heated surfaces for supplying the heat to the viscose solution is far from completely satisfactory, since it is difficult to transfer heat rapidly and uniformly from a solid heating surface to the relatively viscous viscose solution without causing uneven heating and coagulation of said solution.

More particularly, when a viscose solution is passed over a surface having a temperature considerably higher than the temperature of said viscose solution, that portion of the viscose solution which is in direct contact with the heated surface will begin to ripen at a much higher rate, due to its higher temperature. If this portion of the viscose solution is not removed rapidly from the heated surface it will ripen to such an extent that it coagulates. Thereafter succeeding portions of the viscose solution in contact with the heated coagulated material will themselves coagulate, in a similar manner, until a thick layer of coagulated material is built up on the heated surface. By removing the viscose solution rapidly from the heated surface it is possible to prevent the coagulation thereof. To this end, the viscose solution passing over the heated surface may be subjected to violent agitation or there may be a positive removal of the viscose solution from the heated surface, for example by the action of blades scraping continuously over said surface. However, the use of such expedients introduces mechanical and other difficulties into the heating operation. Furthermore, even when such expedients are employed, the transfer of heat takes place relatively slowly, so that the heating equipment must be made undesirably large if relatively large amounts of viscose solution are to be heated rapidly. When it is attempted to avoid coagulation of the viscose on the heating surfaces by decreasing the temperature of said surfaces, the rate of heat transfer is greatly reduced, so that much larger and more costly heating equipment is necessary.

It is therefore an important object of this invention to provide a novel method and apparatus for heating viscose solutions in a continuous, rapid, uniform and economical manner.

A further object of this invention is the provision of a novel method and apparatus for heating liquids.

Other objects of this invention will be apparent from the following detailed description and claims.

In accordance with one embodiment of this invention, viscose solution and a continuous stream of steam, which is advantageously in the substantially dry and saturated state and at subatmospheric pressure, are mixed in a heating zone maintained at subatmospheric pressure. The steam is condensed in the viscose solution so that the latent heat of vaporization of the steam is transferred to the viscose solution, and a continuous stream of heated viscose solution is discharged from the heating zone. Since the latent heat of vaporization of the steam is very high, i. e. on the order of 575 calories per gram, in relation to the specific heat of the viscose solution, a small amount of steam serves to heat a relatively large amount of viscose solution and there is very little dilution of the viscose solution by the water of condensation.

In one preferred form of this invention, the viscose solution circulates continuously in the heating zone and the stream of steam is brought into contact with the circulating viscose solution at one or more areas in the path of said circulating viscose solution. The incoming stream of unheated viscose solution is added continuously to said circulating material. The outgoing stream of heated viscose solution is withdrawn continuously from said circulating material at a rate approximately equal to the rate of introduction of said incoming stream. These rates of introduction and withdrawal are advantageously substantially less than the rate at which the viscose solution is circulated. Thus, for best results, e. g. for most even heating, the rate at which the stream of unheated viscose solution is added is about 1 to 2% of the rate (e. g. in gallons per minute) at which the viscose solution circulates past the area where the steam is added. Accordingly, on the average each molecule of viscose will circulate past the area where the steam is added about 50 to 100 times before it is discharged from the heating zone.

In one embodiment of this invention the heating apparatus is so constructed that the stream of steam is introduced into the viscose solution by means of a duct extending below the upper surface of a body of said solution. The walls of the steam duct become heated due to the passage of steam therethrough, and means are provided for maintaining the viscose solution substantially out of contact with these heated walls for at least a major portion of that length of the duct which is below the upper surface of the body of viscose solution. More particularly, in this embodiment the heating apparatus is provided with an impeller for circulating the viscose solution into intimate contact with the steam and for imparting a rotary motion to the viscose solution so that a vortex is formed in said solution. The duct for introducing the stream of steam extends down into this vortex to a point just above the impeller, the shape of the vortex being such that the rotating viscose solution does not touch the walls of the duct except, in some cases, at the bottom portion of the duct.

If desired the walls of the duct for introducing the stream of steam may be insulated. Thus there may be used a double-walled duct in which the space between the inner, heated, wall of the duct and the outer wall thereof is substantially completely evacuated or filled with suitable thermal insulation. In this case it is not necessary to depend on the shape of the vortex to reduce the extent of contact between said heated wall and the body of viscose solution being heated.

Desirably the apparatus of this invention is also provided with a draft tube, open at both ends, mounted around the aforesaid downwardly extending steam duct and situated above the impeller. The circulating viscose solution passes down through the interior of the draft tube, through the impeller and into contact with the steam, then upwardly around the exterior of the draft tube, over the top of the draft tube and down the interior of the draft tube again. The stream of unheated viscose solution is introduced continuously into the interior of the draft tube and becomes well blended with and heated by the circulating viscose solution before it comes in contact with the steam. A stream of heated viscose solution is withdrawn continuously from the upwardly flowing viscose solution around the outside of the draft tube. As previously stated, the rate of circulation of the viscose solution is high with respect to the rates of addition and withdrawn of the viscose solution so that the temperature of the circulating viscose solution is substantially the same throughout the heating zone. That is, the temperature at a point just before the steam is added is only slightly less than the temperature of the stream of viscose solution being withdrawn.

In order to permit the steam to enter readily below the upper surface of the viscose solution it is desirable to maintain the pressure in the heating zone at a value which is below the pressure of the incoming steam but above the pressure at which the heated viscose solution in said zone will boil. For efficient and rapid heating, as much of the steam as possible should be condensed as rapidly as possible in the viscose solution. To this end there should be some difference in temperature between the steam and the viscose solution. However, there should not be too great a differential between the temperature of the incoming steam and the temperature of the circulating viscose solution since there is then some danger of causing local coagulation of the viscose solution. Thus, the temperature of the incoming steam advantageously should be about 5 to 15 degrees C. above the temperature to which the viscose solution is heated in the heating zone. Due to the high rate of circulation of the viscose solution in the heating zone, the increment of heat which must be added to each particle of viscose as it makes one cycle around the heating zone is very small and, therefore, the process is very effective even when there is only a relatively small difference between the temperature of the steam and the temperature to which the viscose solution is to be heated. Preferably, the viscose solution, which is supplied to the heating zone at a temperature of about 18 to 22° C., is heated therein to a temperature of about 35 to 45° C. For example, in one suitable process the temperature of the stream of substantially dry and saturated steam introduced into the heating zone is about 50° C., while the viscose solution is admitted to the heating zone at a temperature of about 20° C. and is discharged from the heating zone at a temperature of about 40° C.

As stated, it is advantageous to employ the steam in the substantially dry and saturated condition. Superheating the steam has the disadvantage of increasing the temperature of the steam, and therefore of the surfaces of the duct through which the steam is admitted, without causing any substantial increase in the heat content of the steam, as compared with its latent heat of vaporization. In addition, the rate of heat transfer of the superheat of steam to the viscose solution is relatively low. On the other hand, the use of wet steam causes unnecessary dilution of the viscose solution. Furthermore, the use of either wet or superheated steam introduces difficulties in controlling accurately the amount of liquid water or the degree of superheat of the steam, whereas the characteristics of saturated steam may be controlled easily, as by regulating the pressure thereof.

In accordance with one embodiment of this invention the temperature of the heated viscose solution is regulated by a novel arrangement of automatic controls. These controls are responsive to the temperature of the heated viscose solution and the balance between the pressure of the stream of steam entering the heating zone and the pressure in said heating zone. When the temperature of the heated viscose solution varies from the desired value the controls act to change the flow rate and pressure of the stream of incoming steam and the pressure in the heating zone so as to bring the temperature of the heated viscose to the desired value.

By the use of the method and apparatus of this invention the viscose solution is heated continuously, rapidly, uniformly, economically, and without danger of overheating locally, in equipment of relatively small size. For example, the heating operation may be carried out in a heating vessel of such size that the residence time of the viscose solution therein is only several minutes, e. g. about 4 minutes.

The viscose solution employed in the practice of this invention is desirably of the conventional type, having, for example, a cellulose content of about 7 to 8½% and an alkali content of about 5½ to 7%. It is advantageous to subject the viscose solution to deaeration and filtration, in any known manner, before it is fed to the heating zone.

A preferred embodiment of this invention is illustrated in the accompanying drawings, wherein Fig. 1 is an overall diagrammatic view of the apparatus for heating the viscose solution, Fig. 2 is a side view, mainly in cross-section, of a heater wherein the viscose solution is mixed with the saturated steam, Fig. 3 is a side view, mainly in cross-section, showing a portion of the heater and the details of a level control chamber for said heater, and Fig. 4 is a diagrammatic view of a modified arrangement of the controls for regulating the temperature to which the viscose solution is heated.

Like reference numerals indicate like parts throughout the several views of the drawings.

Referring now to the drawings, particularly to Fig. 1 thereof, reference numeral 11 designates an air-tight heater maintained under subatmospheric pressure by the action of a suitable evacuator, such as a steam jet 12 connected by means of a vacuum line 13 to an outlet 14 at the top of said heater. In the heater 11 the temperature of a viscose solution, supplied thereto in a continuous stream at a substantially constant rate by a pump 16, is raised by bringing said solution into contact with a continuous stream of saturated steam at subatmospheric pressure, supplied through a conduit 17 from a tank 18, which tank will be described more fully below. The heated viscose solution leaves the heater 11 through an outlet 19, passes through a level control chamber 21, described more fully below, and is then fed, by means of a pump 22 at a substantially constant rate to a suitable ripening zone (not shown). The volume of the heated viscose solution leaving the heater 11 is slightly greater than the volume of the viscose solution entering the heater, due to the condensation of the steam in the viscose solution and also due, in part, to thermal expansion. The pump 22 is therefore driven at a slightly faster rate than the pump 16.

The air-tight heater 11, whose construction is shown in greater detail in Fig. 2, is supported on a framework 23 and comprises a cylindrical shell 24, having a dished bottom 25 and an upper flange 26, and a flanged cover 27 bolted thereto, there being a gasket 28 between said shell and said cover. For introducing the viscose solution into the heater 11 there is provided a flanged pipe 29, connected to the pump 16 in any suitable manner, the flange of said pipe being bolted to the flange of a neck 31 at the side of the shell 24. The pipe 29 extends, through the neck 31, into the interior of the shell 24, and passes through, and terminates just beyond, a hole 32, slightly larger than said pipe 29, in the upper portion of a vertical draft tube 33. This draft tube 33 is a circular cylinder of relatively large diameter, e. g. about one half the diameter of the shell 24, mounted within said shell and coaxial therewith, and supported at its lower end on the edges of notches 34 formed in a number of radial baffles 36 spaced around the bottom of the shell 24. The draft tube 33 is also supported, at its upper end, by a plurality of struts 37 (only one strut is shown) arranged around said tube and bolted, or otherwise secured, thereto, said struts being welded to the interior of the shell 24.

The saturated steam coming from the tank 18 through conduit 17 is admitted into the heater 11 through a duct 38, which passes through the cover 27 and extends down through the draft tube 33. Advantageously, the diameter of the duct 38 is a relatively large fraction, e. g. about one half, of the diameter of the draft tube 33, and the lower end of said duct is in the same horizontal plane as the lower end of said draft tube.

Mounted at the bottom of the shell 24 is a rotary impeller 39, of conventional type, having a hub 40 and a plurality of blades 41. The impeller 39 is concentric with the duct 38 and the draft tube 33 and its blades 41 are situated just below said duct and draft tube. The impeller 39 is driven by means of a motor 42 (Fig. 1) through a belt 43 and a shaft 44, which shaft passes through a suitable stuffing box and seal 46 situated at the bottom of the shell 24. The rotation of the impeller 39 acts to draw the viscose solution down through the draft tube 33 and to mix the viscose solution with steam entering through the duct 38 so that the viscose solution is heated by the steam. In order to promote the thorough mixing of the stream and the viscose solution, and to avoid reducing the area of the duct 38 around the hub 40, the bottom of the duct 38 is provided with an outwardly extending lip 48 which serves to direct the steam outwardly.

The rotation of the impeller 39 imparts a rotary motion to the viscose solution in the draft tube 33, thus creating a vortex in said solution, so that the surface of the viscose solution assumes approximately the position shown by the dotted lines 49 in Fig. 2. Accordingly, the viscose solution passing down the draft tube 33 makes only limited contact, if any, with the outer surface of the central duct 38, which surface is at substantially the same temperature as the steam passing through said duct. Although it is desirable to maintain the viscose solution entirely out of contact with the surface of the duct 38 this is, under some conditions, not entirely feasible since it involves the use of very high impeller speeds in order to impart to the vortex of viscose solution the shape necessary for this purpose. However, the apparatus of this invention operates quite satisfactorily when the viscose solution comes into contact with a limited portion of the duct 38, for example, when the vortex is of such shape that the viscose contacts the duct 38 at a level not above ½ the vertical distance between the upper level of the vortex and the bottom of said duct. It should be noted that the viscose solution at the bottom of the vortex is rotating at a very rapid rate so that any portion of this viscose solution which comes in contact with the duct 38 is removed rapidly therefrom and there is practically no tendency for deposits of viscose solution to build up on the walls of said duct.

In order that accurate observations may be made of the shape of the vortex in the heater 11, indicating means are provided in the interior of said heater. Thus, near the top of the heater there is mounted a notched depth scale 51 for indicating the level of the upper surface of the viscose solution, while on the outer surface of the duct 38 there are a plurality of uniformly vertically-spaced weld beads 52 to enable an observer looking through a sight glass (not shown) mounted in the cover 27 of the heater 11 to ascertain accurately the point where the viscose solution comes in contact with the duct. To permit these observations to be made more easily the cover 27 may be provided with a lamp (not shown) for illuminating the interior of the heater 11 when desired.

Due to the rotation of the impeller 39 the viscose solution and steam are driven outwardly in a direction away from the hub 40. In order to avoid any tendency for the formation of eddy currents flowing from the tips of the blades 41 upwardly into the draft tube 33 adjacent the wall of said draft tube and then downwardly back into the blades 41, the bottom of the draft tube 33 is provided with a circumferential angle strip 56 having a horizontal lower surface 57 extending inwardly from the wall of said draft tube. The upper surface 58 of the angle strip 56 is directed at an angle so that the viscose solution in the draft tube 33 flows smoothly down to the blades 41 and there are no dead spots, or quiescent portions, in said viscose solution just above said angle strip. The construction and arrangement of the lower surface 57 of the angle strip 56 is such that the outwardly flowing viscose solution and steam are subjected to a shearing action between said lower surface 57 and the upper surfaces of the blades 41. This shearing action tends to reduce the size of the bubbles of steam in the viscose solution and thereby promotes more rapid condensation of said steam and, accordingly, more rapid transfer of the latent heat of vaporization of the steam to the viscose solution.

The rotation of the impeller 39 also tends to cause the formation of eddy currents flowing from the tips of the blades 41 downwardly towards the dished bottom 25 of the shell 24, inwardly along said bottom and then upwardly back into the blades 41 adjacent the hub 40. Unless these currents are minimized, a considerable proportion of the power supplied to the impeller may be diverted to their production. In one preferred embodiment of this invention these eddy currents are greatly reduced by the provision of a horizontal shrouding plate 59 attached to the bottom edges of all of the blades 41 and extending from the hub 40 to the tips of said blades.

As the mixture of viscose solution and bubbles of steam leaves the tips of the blades 41 it is moving mainly in a generally horizontal direction tangential to the impeller 39. The dished bottom wall 25 of the shell 24 and the radial baffles 36 serve to guide this mixture so that it leaves the bottom portion of the shell in the form of an upwardly flowing stream passing through the annular space between the draft tube 33 and the shell 24. If the baffles 36 were not provided this stream would have a relatively large rotational velocity in comparison with its vertical velocity. That is, this stream would tend to move in a spiral of relatively small pitch around the draft tube 33 and a large portion of the power imparted to the impeller 39 would be used up in maintaining the rotation of the stream. The baffles 36 act to reduce this undesired rotational motion markedly by transforming it into rectilinear motion, thus greatly reducing the power required to drive the impeller 39 at the desired velocity. In addition, the inner edges of the baffles 36 are located in close proximity to the tips of the blades 41, so that bubbles of steam moving outward from said blades are subjected to a shearing action between the tips of the blades and the inner edges of the baffles. This shearing action causes a reduction in the size of the bubbles of steam, and thereby promotes rapid transfer of heat from the steam to the viscose solution.

As the mixture of steam and viscose solution flows upwardly in the annular space between the draft tube 33 and the shell 24 most of the steam condenses in the viscose solution. A minor portion, preferably about 1 to 2%, of the resulting heated viscose solution leaves the shell 24 through the outlet 19, while the remainder of the heated viscose circulates over the top of the draft tube 33 and then down through said draft tube where it comes in contact with freshly supplied cool viscose and serves to raise the temperature of the latter.

As stated, the heated viscose leaving through the outlet 19 passes through the level control chamber 21. This chamber 21 serves to regulate the level of the viscose solution in the heater 11 and thereby serves to control the amount of viscose solution in said heater and the shape of the vortex therein. The chamber 21 is in the form of a vessel 61 (Fig. 3) having a tapered bottom 62 leading to an outlet pipe 63 and having a cover 64 bolted, or otherwise secured, thereto. The interior of the chamber 21 is maintained at substantially the same subatmospheric pressure as the interior of the heater 11 in any suitable manner, e. g. by means of an outlet 66 in the cover 64, connected to the vacuum line 13 (see Fig. 1). The heated viscose solution is delivered from the heater 11 to the interior of the vessel 61 by means of an open-ended standpipe 67 leading into and partially contained within said vessel, the top of the standpipe being provided with an adjustably mounted flanged tubular extension 68 closely fitted telescopically in said standpipe. The position of the extension 68 may be adjusted in any suitable manner, e. g. by means of a rod 69 having a yoke 71 bolted, or otherwise secured, to the flange of said extension, which rod extends upwardly through the cover 64 through a stuffing box indicated generally by reference numeral 72. The rod 69 may be moved manually to adjust the position of the extension 68 to the desired height, following which the extension and rod may be maintained in the desired position by means of a set screw 73 mounted at the top of the stuffing box 72. In operation, the viscose solution overflows from the top of the extension 68 and passes downwardly into the outlet pipe 63. Accordingly, since the interior of the vessel 61 is maintained at the same pressure as the interior of the heater 11, the top level of the viscose solution in said heater will be substantially the same as the level of the top of the extension 68. In practice, the main body of the standpipe 67 is so mounted that it extends to a point above the level of the top of the draft tube 33 in the heater 11. Thus, when the extension 68 is in its lowest position the upper surface of the viscose solution in the heater will be maintained above the top of the draft tube 33 so as to permit circulation of the viscose solution in the heater 11 around the top of said draft tube. When the rod 69 and extension 68 are moved upwardly the level of the viscose solution is raised to a still greater height above the top of the draft tube 33.

As stated, the steam at subatmospheric pressure is supplied to the heater 11 from the tank 18. This tank is partially filled with water, e. g. to the level indicated at 74, the water being supplied from a line 76 provided with a valve 77. At the bottom of the tank 18 is a multi-apertured sparge pipe 78 connected through a throttle valve 79 to a source of steam at superatmospheric pressure. This steam becomes superheated as it passes through the throttle valve 79, then bubbles from the sparge pipe 78 through the water in the tank, thereby becoming saturated at the subatmospheric pressure maintained in the tank, and leaves the top of the tank through an outlet 81 connected by means of the line 17 to the duct 38 of the heater 11.

The apparatus of this invention is provided with means for controlling the temperature to which the viscose solution is heated. Thus, in one embodiment, illustrated in Fig. 1, there is a controller and recorder 82, of conventional construction, responsive to the temperature of the viscose leaving the outlet pipe 63 of the level control chamber 21. This controller and recorder 82, hereinafter termed the "temperature-responsive controller," communicates with and controls the steam throttle valve 79 at the tank 18. There is also provided another controller and recorder 83, also of conventional construction, which is responsive to the ratio of the pressure of the steam supplied to the heater, as measured in the duct 38, to the pressure in the interior of the heater 11, as measured at the outlet 14, or, alternatively, is responsive to the difference between these two pressures. This second controller and recorder 83, hereinafter termed the "pressure balance-responsive controller," controls the pressure in the interior of the heater 11 by controlling a valve 84 regulating the admission of air from the atmosphere to the vacuum line 13 leading to the evacuator 12.

In operation the temperature-responsive controller 82 is set at the temperature desired for the heated viscose solution. If the actual temperature of the heated viscose solution is less than this value the temperature-responsive controller 82 acts to open the steam throttle valve 79 to a greater extent, thus admitting more steam, at a higher pressure, to the tank 18 and increasing the pressure of the steam flowing to the heater 11. This increased pressure causes the pressure balance-responsive controller 83 to open the valve 84 to a greater extent so as to maintain a constant ratio between the pressure of the incoming steam and the pressure in the heater 11. The opposite effects take place if the actual temperature of the heated viscose solution is greater than the desired value. In the latter case the temperature-responsive controller 82 acts to decrease the opening of the throttle valve 79, thus decreasing the pressure of the steam flowing to the heater 11, whereupon the pressure balance-responsive controller 83 acts to decrease the opening of the valve 84 so as to decrease the pressure in the heater.

An alternative control arrangement is illustrated in Fig. 4 wherein the positions and connections of the various parts are identical with those in Fig. 1 except that the valve 84 is controlled by the temperature-responsive controller 82 and the steam throttle valve 79 is controlled by the pressure balance-responsive controller 83. In operation, the temperature responsive controller 82 is set at the temperature desired for the heated viscose solution. If the actual temperature of the heated viscose solution is less than this value the temperature-responsive controller 82 acts to open the valve 84 to a greater extent thus raising the pressure in the heater 11. Because of this increased pressure the pressure balance-responsive controller 83 acts to open the steam throttle valve 79 to a greater extent so that the saturated steam is fed to the heater 11 at a higher pressure and temperature, thus raising the temperature of the viscose solution. Similarly, when the temperature of the viscose is above the desired value the temperature-responsive controller 82 acts to decrease the opening of the valve 84, thus decreasing the pressure in the heater 11 and causing the pressure balance-responsive controller 83 to act on the steam throttle valve 79 to admit less steam, at a lower pressure, to the tank 18, thereby causing a decrease in the temperature of the heated viscose solution.

It is to be understood that the foregoing detailed description is given merely by way of illustration and that many variations may be made therein without departing from the spirit of my invention.

Having described my invention, what I desire to secure by Letters Patent is:

1. Process for the heating of viscose to raise its temperature, which comprises supplying a continuous stream of a viscose solution to a zone maintained at subatmospheric pressure, supplying a continuous stream of steam at subatmospheric pressure to said zone, mixing said viscose solution and said steam in said zone and condensing said steam in said viscose solution whereby the latent heat of vaporization of said steam is transferred to said viscose solution, and continuously discharging a stream of heated viscose solution from said zone.

2. Process for the heating of viscose to promote the ripening thereof, which comprises supplying a continuous stream of a viscose solution to a zone maintained at subatmospheric pressure, supplying a continuous stream of substantially saturated steam at subatmospheric pressure to said zone, mixing said viscose solution and said steam in said zone and condensing said steam in said viscose solution whereby the latent heat of vaporization of said steam is transferred to said viscose solution, and continuously discharging a stream of heated viscose solution from said zone.

3. Process as set out in claim 2 in which said viscose solution is heated in said zone to a temperature of about 35 to 45° C. and said stream of steam is at a temperature not more than about 15° C. above the temperature to which said viscose solution is heated in said zone.

4. Process as set forth in claim 2 in which the upper surface of the viscose solution in said zone is maintained at a predetermined level, said stream of substantially saturated steam is brought into contact with said viscose solution by means of a duct extending downwardly below said level, the walls of said duct being heated by contact with said steam, and said viscose solution is maintained substantially out of contact with said heated walls for a major portion of the length of said duct in said zone below said level.

5. Process for the heating of viscose to promote the ripening thereof, which comprises establishing a vortex in a body of viscose solution, said vortex extending downward from an upper surface of said body of viscose solution, passing steam through at least the upper portion of said vortex and out of contact with said body of viscose solution, and bringing said steam into contact with said viscose solution at a point below said upper surface.

6. Process for the heating of viscose solution to promote the ripening thereof, which comprises supplying a continuous stream of viscose solution to be heated to a zone, establishing a vortex in said viscose solution in said zone, said vortex extending downward from an upper surface of the viscose solution in said zone, passing a continuous stream of steam through a duct extending down through at least the upper portion of said vortex, the walls of said duct being heated by contact with said steam, said heated walls being substantially out of contact with said viscose solution for a major portion of the length of said duct below said upper surface, bringing said steam into contact with said viscose solution in said zone at a point below said upper surface, and continuously discharging a stream of heated viscose solution from said zone.

7. Process as set forth in claim 6 in which said steam is condensed in said viscose solution whereby the latent heat of vaporization of said steam is transferred to said viscose solution.

8. Process as set forth in claim 7 in which said steam is in substantially saturated condition and said zone and said steam are maintained at subatmospheric pressure.

9. Process as set forth in claim 8 in which said viscose solution is heated in said zone to a temperature of about 35 to 45° C. and said stream of steam is at a temperature not more than about 15° C. above the temperature to which said viscose solution is heated in said zone.

10. Apparatus for heating a liquid, said apparatus comprising a container for liquid, a duct for heating fluid extending into said container for bringing said heating fluid into contact with said liquid, and means, independent of said duct for establishing a vortex in the liquid in said container around said duct whereby said liquid is maintained substantially out of contact with said duct for a major portion of the length of said duct, said duct having an outlet, disposed substantially centrally of said vortex, for introducing said heating fluid into said liquid.

11. Apparatus for heating liquids, which comprises a container, means for supplying a continuous stream of liquid to be heated to said container, means for supplying a continuous stream of a heating fluid to said container, a duct for receiving said stream of heating fluid and for bringing said fluid into contact with said liquid to heat said liquid, said duct extending down into said container, means, independent of said duct, for establishing a vortex in the liquid in said container around said duct whereby said liquid is maintained substantially out of contact with said duct for a major portion of the length of said duct below the supper surface of said vortex, said duct having an outlet, disposed substantially centrally of said vortex, for introducing said heating fluid into said liquid, and means for discharging a continuous stream of said heated liquid from said container.

12. Apparatus for heating liquids, which comprises a container, a draft tube mounted vertically in said container, means for supplying a continuous stream of liquid to be heated to the interior of said draft tube, means for supplying a continuous stream of a heating fluid to said container, a duct for receiving said stream of heating fluid and for bringing said fluid into contact with said liquid to heat said liquid, said duct extending down into said draft tube and being substantially concentric therewith, an impeller mounted for rotation below said draft tube and said duct for drawing said liquid down through said draft tube into admixture with said fluid and for imparting a rotary motion to the liquid in said draft tube so as to form a vortex around said duct with said liquid substantially out of contact with said duct for a major portion of the length of said duct below the upper surface of said vortex, and an outlet for the withdrawal of a continuous stream of heated liquid from said container.

13. Apparatus as set forth in claim 11 in which there are means for maintaining said container under subatmospheric pressure.

14. Apparatus as set forth in claim 12 in which said draft tube is cylindrical and is spaced from the walls of said container, the means for supplying a continuous stream of liquid to the interior of the draft tube comprises a pipe communicating with a source of said liquid outside said tank and passing through an opening in a wall of said draft tube above said impeller, and there is an adjustable overflow chamber operatively connected to said outlet for maintaining the level of the liquid in said container at a predetermined point.

15. Apparatus for heating viscose, comprising a tank for holding a body of water and maintained at subatmospheric pressure, means for supplying steam continuously to said tank, adjustable means comprising a throttle valve controlling the admission of said steam to said tank, means for introducing the throttled steam continuously below the surface of said body of water whereby continuously to produce saturated steam at subatmospheric pressure above said body of water, a heater, means for supplying a continuous stream of said saturated steam to said heater, means for supplying a continuous stream of a viscose solution to said heater, means in said heater for mixing said viscose solution with said saturated steam whereby said viscose solution is heated by condensation of said steam, means for maintaining said heater at subatmospheric pressure, adjustable means for varrying the pressure in said heater, and means for discharging a continuous stream of said heated viscose solution from said heater.

16. Apparatus as set forth in claim 15, said apparatus comprising a controller responsive to the temperature of said discharged viscose for controlling one of said adjustable means, and a controller responsive to the pressures in said heater and in said continuous stream of saturated steam for controlling the other of said adjustable means.

17. Process for raising the temperature of a viscose solution which comprises continuously circulating viscose solution in a heating zone, introducing a continuous stream of substantially dry and saturated steam into contact with said circulating viscose solution at an area in the path of said circulating viscose solution, condensing said steam in said solution whereby the latent heat of vaporization of said steam is transferred to said viscose solution, continuously adding a continuous stream of unheated viscose solution to said heating zone and continuously withdrawing a continuous stream of heated viscose solution from said heating zone, said stream of steam being at a temperature not more than about 15° C. above the temperature of said circulating viscose solution, the rate at which said viscose solution circulates past said area being greater than the rates of addition and withdrawal of said streams of viscose solution.

18. Process as set forth in claim 17 in which said viscose solution is heated in said zone by said steam to a temperature of about 35 to 45° C., said stream of steam is at a temperature which is about 5 to 15° C. above the temperature of said heated viscose solution and the rate at which said viscose solution circulates past said area is about 50 to 100 times the rate of addition of said continuous stream of viscose solution, measured volumetrically.

19. In a process for quickly and precisely ripening a viscose solution, the improvement which comprises heating said viscose solution to a temperature of about 35 to 45° C. by mixing therewith substantially dry and saturated steam having a temperature which is about 5 to 15° C. above the temperature to which the viscose solution is heated.

20. Apparatus for heating a liquid, comprising a container, means for supplying a continuous stream of liquid to be heated to said container, adjustable means for varying the pressure in said container, means for supplying a continuous stream of substantially saturated vapor to said container so as to heat said liquid in said container by contact with said vapor, adjustable means for varying the temperature and pressure of said stream of substantially saturated vapor means for discharging a continuous stream of heated liquid from said container, control means responsive to the temperature of said stream of heated liquid for adjusting one of said adjustable means, and control means, responsive to both the pressure in said container and the pressure in said stream of substantially saturated vapor, for adjusting the other of said adjustable means.

21. Process for the heating of viscose to promote the ripening thereof which comprises supplying a continuous stream of a viscose solution to a mixing zone, supplying a continuous stream of steam to said zone, mixing said viscose solution and said steam in said zone and condensing said steam in said viscose solution whereby the latent heat of vaporization of said steam is transferred to said viscose solution, and continuously discharging a stream of heated viscose solution from said zone.

22. Apparatus for heating a liquid, said apparatus comprising a container for liquid, a duct for heating fluid extending into said container for bringing said heating fluid into contact with said liquid, and means for establishing a vortex in the liquid in said container around said duct whereby said liquid is maintained substantially out of contact with said duct for a major portion of the length of said duct, said duct having an outlet, disposed substantially centrally of said vortex, for introducing said heating fluid into said liquid, said means for establishing a vortex comprising an impeller mounted for rotation at said outlet and positioned to receive the heating fluid leaving said duct.

References Cited in the file of this patent

UNITED STATES PATENTS

| | | |
|---|---|---|
| 1,195,722 | Powers et al. | Aug. 22, 1916 |
| 1,357,946 | Brozykowski | Nov. 9, 1920 |
| 1,797,769 | Grindrod | Mar. 24, 1931 |
| 1,938,722 | Richter | Dec. 12, 1933 |
| 1,942,270 | Resek | Jan. 2, 1934 |
| 2,126,044 | Rolleston | Aug. 9, 1938 |
| 2,249,175 | Richter et al. | Jan. 15, 1941 |
| 2,435,416 | Thomson et al. | Feb. 3, 1948 |
| 2,490,533 | McAlear | Dec. 6, 1949 |
| 2,561,256 | Wilson et al. | July 17, 1951 |
| 2,610,837 | Puster | Sept. 16, 1952 |